(12) United States Patent
Zhang et al.

(10) Patent No.: US 8,058,204 B2
(45) Date of Patent: Nov. 15, 2011

(54) METHOD FOR GENERATING A SHELL OF NOBLE METAL OVERLAID ON A CORE OF NON-NOBLE METAL, AND CATALYSTS MADE THEREBY

(75) Inventors: Junliang Zhang, Rochester, NY (US); Frederick T. Wagner, Fairport, NY (US); Zhongyi Liu, Pittsford, NY (US); Michael K. Carpenter, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/257,425

(22) Filed: Oct. 24, 2008

(65) Prior Publication Data

US 2010/0105548 A1    Apr. 29, 2010

(51) Int. Cl.
*B01J 23/00* (2006.01)
*B01J 23/56* (2006.01)
*B01J 23/66* (2006.01)

(52) U.S. Cl. ........ 502/313; 502/325; 502/339; 502/344; 502/347; 502/317; 502/326

(58) Field of Classification Search ................ None
See application file for complete search history.

(56) References Cited

U.S. PATENT DOCUMENTS

| 7,053,021 | B1 | 5/2006 | Zhong et al. |
| 2006/0039857 | A1 | 2/2006 | Adcock |

FOREIGN PATENT DOCUMENTS

| CN | 1358596 | 7/2002 |
| JP | 2005-240088 | 9/2005 |
| WO | 99/07502 | 2/1999 |

OTHER PUBLICATIONS

Zhang, J., Platinum Monolayer on Nonnoble Metal-Noble Metal Core-Shell Nanoparticle Electrocatalysts for O2 Reduction, The Journal of Physical Chemistry, 2005, 109, pp. 22701-22704, published on Web Nov. 11, 2005.*
Szu-Han Wu et al., "Synthesis and Characterization of Nickel Nanoparticles by Hydrazine Reduction in Ethylene Glycol", Science Direct, Academic Press, Journal of Colloid and Interface Science, pp. 282-286, 2003.
Dan V. Goia, "Preparation and Formation Mechanisms of Uniform Metallic Particles in Homogeneous Solutions", Journal of Materials Chemistry, pp. 451-458, 2004.
P. Saravanan et al., "Submicron Particles of Co, Ni and Co-Ni Alloys", Bulletin of Materials Science, vol. 24, No. 5, pp. 515-521, Oct. 2001.
Zhang, et al., Platinum Monolayer on Nonnoble Metal—Noble Metal Core—Shell Nanoparticle Electrocatalysts for O2 Reduction, 2005 American Chemical Society, Publication Date Nov. 11, 2005, 5 pages.

* cited by examiner

*Primary Examiner* — Emily Le
*Assistant Examiner* — Sarah A Slifka
(74) *Attorney, Agent, or Firm* — Dinsmore & Shohl LLP

(57) ABSTRACT

An electrocatalyst is described. The electrocatalyst includes a core of a non-noble metal or non-noble metal alloy; and a continuous shell of a noble metal or noble metal alloy on the core, the continuous shell being at least two monolayers of the noble metal or noble metal alloy. Methods for making the electrocatalyst are also described.

13 Claims, No Drawings

METHOD FOR GENERATING A SHELL OF NOBLE METAL OVERLAID ON A CORE OF NON-NOBLE METAL, AND CATALYSTS MADE THEREBY

The invention relates generally to electrocatalysts and more particularly to electrocatalysts having improved Pt mass activity for the oxygen reduction reaction compared to commercial catalysts.

BACKGROUND OF THE INVENTION

In recent decades, there has been considerable progress in making electrocatalysts of Pt/C. These catalysts have been improved by the development of methods of dispersing Pt metal into 2-3 nm particles deposited on carbon supports.

For current commercial products, the level of Pt mass activity toward the oxygen reduction reaction (ORR) is approximately 0.08 A/mg Pt in Membrane Electrode Assembly (MEA) tests, and 0.1 A/mg Pt on Rotating Disk Electrode (RDE) tests at 0.9 V (iR free).

However, in order to meet the automotive-competitive (AC) target for Polymer Electrolyte Membrane (PEM) fuel cells for vehicle applications, the Pt mass activity toward the ORR of Pt-containing cathode catalysts must be increased by at least four to eight times over current state-of-the-art catalysts, without compromising catalyst durability.

One attempt to meet this target involves the use of alloy nanoparticles of Pt with 3d transition metal(s). Although these materials have been reported to increase Pt mass activity for ORR by two to three times, that is not sufficient to meet the goal.

Another approach toward improved ORR catalysts relies on the use of Pt monolayer catalysts. However, Pt monolayers are difficult to generate and can only be deposited on noble metal substrates, or on a non-noble metal substrate with a pre-existing noble-metal shell.

Therefore, there remains a need for an electrocatalyst which improves the Pt mass activity toward the ORR, and for methods of making such electrocatalysts.

SUMMARY OF THE INVENTION

The present invention meets this need by providing an improved electrocatalyst. The electrocatalyst includes a core of a non-noble metal or non-noble metal alloy; and a continuous shell of a noble metal or noble metal alloy on the core, the continuous shell being at least two monolayers of the noble metal or noble metal alloy.

Another aspect of the invention is a method of making the electrocatalyst. The method includes providing an initial mixture of a first solvent and reducing agent with a compound of a non-noble metal or a non-noble metal alloy; heating the initial mixture to a temperature near a boiling point of the solvent and reducing agent; reducing the compound to form particles of the non-noble metal or non-noble metal alloy in the initial mixture; cooling the initial mixture to a temperature less than near the boiling point of the first solvent and reducing agent; adding a second mixture of a compound of a noble metal or noble metal alloy and a second solvent to the cooled mixture to form a combined mixture; and reducing the compound to the noble metal or noble metal alloy in the combined mixture to form a continuous shell of the noble metal or noble metal alloy on the particles.

By the terms "on the core" or "on the particles," we mean directly next to without any intermediate layers.

DETAILED DESCRIPTION OF THE INVENTION

In one embodiment, there is a core-shell particle electrocatalyst with a noble metal oligolayer deposited on a non-noble metal core. The noble metal shell has a thickness of at least two monolayers. The noble metal shell on the non-noble metal core particle catalyst markedly increases the Pt mass activity of the catalyst for the ORR. The Pt specific activity is typically at least about two or three times higher than that of a conventional Pt/C catalyst, more typically at least about four times higher, more typically about five to about ten times higher. Although not wishing to be bound by theory, the increase is believed to be due to the formation of a continuous noble metal layer with low curvature, which results from the large size of the non-noble metal core particles.

The core is typically in the range of about 100 nm to about 2 μm. It is made of a non-noble metal or non-noble metal alloy. The non-noble metal alloy can be a mixture of non-noble metals. Alternatively, one or more non-noble metals can be combined with one or more additional elements, including, but not limited to, non-metals, and noble metals. Suitable non-metals include, but are not limited to, C, P, S, N, B, Si, or combinations thereof. If a non-metal is combined with non-noble metals in the core, the core could contain more than more than 50% of the non-metal. If non-noble metals are combined with noble metals in the core, the core would typically contain at least about 50% (atomic) non-noble metal. Suitable non-noble metals include, but are not limited to, Ni, Sc, Ti, V, Cr, Mn, Fe, Co, Cu, Zn, Pb, Sn, Bi, Sb, Nb, Mo, Ta, Re, W, Zr and combinations thereof. The amount of noble metal in the core should be balanced between the increased cost due to higher amounts of noble metal and the increased stability of the catalyst with higher levels of noble metal.

The shell has a thickness of at least two monolayers of a noble metal or noble metal alloy. There will generally be between 2 and about 50 monolayers, or between 2 and about 40 monolayers, or between 2 and about 30 monolayers, or between 2 and about 20 monolayers, or between 4 and about 10 monolayers. The noble metal alloy can be a mixture of noble metals. Alternatively, one or more noble metals can be combined with one or more additional elements, including, but not limited to, non-metals, and non-noble metals. If noble metals are combined with non-noble metals in the shell, the shell would typically contain at least about 50% (atomic) noble metal. When the catalyst is to be used in an acidic PEM fuel cell, the shell typically contains less than about 25% (atomic) non-noble metal.

The electrocatalyst can be made by reducing a compound or compounds containing non-noble metals to metal particles using a solvent and reducing agent heated to or near the boiling temperature of the solvent and reducing agent, followed by displacement of the surface non-noble metal atoms with noble metal atoms at a lower temperature after the mixture has cooled.

Any compound in which the non-noble metal can be reduced in the solvent to the metal can be used. Suitable compounds include, but are not limited to, metal salts, oxides, organometallic compounds, coordination compounds, and metal particles. Suitable organometallics include, but are not limited to, metal cyanides, metal porphyrins or phthalocyanines, metal alkoxides, metal acetylacetonates, metal 2-ethylhexanoates, The solvent and reducing agent can be a single material, such as an alcohol. Any alcohol can be used if the reducing potential of the alcohol changes sufficiently with temperature. The alcohol is typically a glycol or polyol. The alcohol can be a mixture of alcohols, for example, mixtures of polyols. Suitable single materials that can be used as the solvent and reducing agent include, but are not limited to, glycols or polyols, such as ethylene glycol, diethylene glycol, propylene glycol, low molecular weight polyethylene glycol, 1,2-propanediol, and pentaerythritol.

Alternatively, the solvent and reducing agent can be different materials. The reducing agent would have to be able to reduce the core material at high temperature, but not reduce the shell material at lower temperature. Suitable solvents include, but are not limited to, organic solvents and aqueous solvents. The use of organic solvents is more desirable than aqueous solvents. For example, an organic solvent could be used in combination with an alcohol, such as a glycol or polyol. Other reducing agents could also be used.

The solution of non-noble metal, and first solvent and reducing agent is heated to a temperature near the boiling temperature of the first solvent and reducing agent. By near the boiling temperature, we mean about 5° C. above the boiling temperature to about 50° C. below the boiling temperature.

A dispersant can be added to the first solvent and reducing agent, e.g., polyol, to prevent agglomeration of the non-noble metal particles before the solution is heated, if desired. Suitable dispersants include, but are not limited to, polyvinylpyrrolidone, gum arabic, sodium dodecyl sulfate, cetyltrimethylammonium bromide (CTAB), polyethylene glycol (40) monostearate (Polyoxyl 40 Stearate).

The size and shape of the non-noble metal particles can be controlled by the non-noble metal concentration, temperature, pH, and the composition of the polyol and dispersant, as is known by those skilled in the art.

After the non-noble metal particles are formed, the solution is cooled to a temperature less than near the boiling temperature of the solvent and reducing agent. By a temperature less than near the boiling point we mean more than about 50° C. below the boiling temperature. The solution is preferably cooled to temperature of less than about 80° C.

A solution of a compound of a noble metal or noble metal alloy in a second solvent is added to the cooled mixture. The non-noble metal on the surface of the particle is displaced by the noble metal to form a noble metal shell on the non-noble metal core. The second solvent can be the same as the first solvent and reducing agent (if a single material is used), or as the first solvent (if the solvent and reducing agent are different materials), or they can be different, if desired.

The displacement of the non-noble metal (alloy) by the noble metal (alloy) typically occurs in a non-aqueous solution with high viscosity (e.g., about 10 mPa/s or higher) and low ionic strength (e.g., about 0.01 M or less). The second solvent (e.g., polyol) acts as a dispersant for the noble metal (alloy) due to the adsorption of polyol on the noble metal (alloy) preventing aggregation of the noble metal (alloy). Due to the low ionic strength and high viscosity of the solvent, the local galvanic cells which are usually seen in aqueous solutions are prevented. Therefore, the only reducing agent for the noble metal (alloy) at the cooled temperature is the surface atoms of the non-noble metal (alloy) particles. These features facilitate the formation of a uniform continuous layer of noble metal (alloy). A reducing agent can optionally be included in the solution, if desired.

The continuous noble metal (alloy) layer has low curvature due to the size of the non-noble metal (alloy) core particles. Although not wishing to be bound by theory, it is believed that this helps provide the increased activity. The continuous layer also provides improved durability of the catalyst.

The solution of noble metal (alloy) shell/non-noble metal (alloy) core particles can be reheated, if desired. This will produce an alloy shell of noble metal/non-noble metal.

In a fuel cell application, the large particle size of the core-shell particles may provide enough void volume and porosity that a carbon support would not be necessary. This would eliminate the problem of carbon corrosion.

EXAMPLE 1

3.98 g $(CH_3COO)_2Ni \cdot 4H_2O$ was dissolved in 400 ml of ethylene glycol in a 3-necked reflux flask, and mechanically stirred for 60 minutes. The solution was heated to 80° C. and held at 80° C. for 1 hr, then the solution was further heated to the boiling point (around 190° C.) and held at that temperature overnight (16 hrs) with reflux and $N_2$ gas purge. The green solution changed into a black colloidal mixture. The colloidal mixture was cooled down to room temperature. 66.9 mg of $K_2PtCl_4$ was dissolved in 100 ml of ethylene glycol and stirred for 60 minutes. The Pt solution was gradually added into the Ni/ethylene glycol colloid. After 2 hr at room temperature, the mixture was heated to 80° C., and held at 80° C. for 1 hr. The mixture was cooled down to room temperature again. During the whole process, the mechanical stir in the flask was kept at 300 rpm. The particles were filtered out and washed with plenty of water. The particles were dried in air overnight.

The z-contrast TEM images of PtNi particles synthesized by this approach showed the formation of spherical core-shell particles with a Pt shell covering a Ni core. Rotating-disk electrode (RDE) testing of the core-shell particles for ORR showed that the Pt specific activity at 0.9 V was 860 $\mu A/cm^2$ Pt, and the Pt mass activity was 0.03 A/mg Pt. The Pt shell had a thickness of 60-70 monolayers.

EXAMPLE 2

By changing the Pt:Ni atomic ratio, another batch of core-shell particles were synthesized. 1 gm of $(CH_3COO)_2Ni \cdot 4H_2O$ with 0.25 g gum arabic were dissolved in 100 ml ethylene glycol and mechanically stirred for 60 minutes. The Ni solution was heated to 80° C. and held at 80° C. for 1 hr; the solution was further heated to the boiling point (around 190° C.) and held at that temperature for 2 hr. 83.7 mg of $K_2PtCl_4$ was dissolved in 50 ml of ethylene glycol and stirred for 60 minutes. The Pt solution was gradually added into the Ni/ethylene glycol colloid. After 2 hr at room temperature, the mixture was heated to 80° C., and held at 80° C. for 1 hr. The mixture was cooled down to room temperature. During the whole process, the mechanical stir in the flask was kept at 300 rpm. The particles were filtered out and washed with plenty of water. The particles were dried in air overnight. The PtNi particles showed an improved Pt mass activity of 0.35 A/mg Pt with a specific activity of 650 $\mu A/cm^2$ Pt. The Pt shell thickness was estimated to be 4-5 monolayers.

The Pt mass activity and specific activity can be further improved by adjusting the experimental parameters in the synthesis process; such as the concentration of solutions, the temperature and time of each heating step, the type and pH of the solvents, and the type and amount of surfactants. Z-contrast microscopy was shown to provide particularly effective feedback for tuning the synthesis process. From the Z-contrast image, the particle size, shape, the thickness of the Pt shell and even the roughness of the Pt shell can be shown. These are critical information for designing next step experiments.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of making an electrocatalyst comprising:
providing an initial mixture of a first solvent and reducing agent with a compound of a non-noble metal or a non-noble metal alloy;
heating the initial mixture to a temperature near a boiling point of the first solvent and reducing agent;
reducing the compound to form non-noble metal or non-noble metal alloy particles without a carbon support in the initial mixture;
cooling the initial mixture with the particles to a temperature less than near the boiling point of the first solvent and reducing agent;
adding a second mixture of a compound of a noble metal or noble metal alloy and a second solvent to the cooled initial mixture with the particles to form a combined mixture; and
reducing the compound of the noble metal or noble metal alloy in the combined mixture to the noble metal or noble metal alloy at the cooled temperature to form a continuous shell of the noble metal or noble metal alloy on the particles.

2. The method of claim 1 further comprising adding a dispersant to the initial mixture before heating the initial mixture.

3. The method of claim 1 further comprising heating the combined mixture with the continuous shell of the noble metal or noble metal alloy on the particles to form a continuous alloy shell of the noble metal or noble metal alloy and the non-noble metal or non-noble metal alloy on the particles.

4. The method of claim 1 wherein the first mixture is cooled to the temperature of less than 80° C.

5. The method of claim 1 wherein the compound of the non-noble metal or non-noble metal alloy is selected from salts, oxides, organometallic compounds, metal particles, or combinations thereof.

6. The method of claim 1 wherein the compound of the noble metal or noble metal alloy is selected from salts, oxides, organometallic compounds, metal particles, or combinations thereof.

7. The method of claim 1 wherein the first solvent and reducing agent or the second solvent is an alcohol.

8. The method of claim 1 wherein the first solvent and reducing agent or the second solvent is a glycol or polyol.

9. The method of claim 1 wherein the first solvent and reducing agent or the second solvent is a mixture of alcohols.

10. The method of claim 1 wherein the first solvent and reducing agent is a mixture of an organic solvent and a glycol or polyol.

11. The method of claim 1 further comprising adding a reducing agent to the second mixture.

12. The method of claim 1 wherein the shell has between two and about 50 monolayers of the noble metal or noble metal alloy.

13. The method of claim 1 wherein the noble metal or noble metal alloy is selected from Pt, Pd, Rh, Ir, Ru, Os, Au, Ag, Cu, or combinations thereof.

* * * * *